Figure 1:
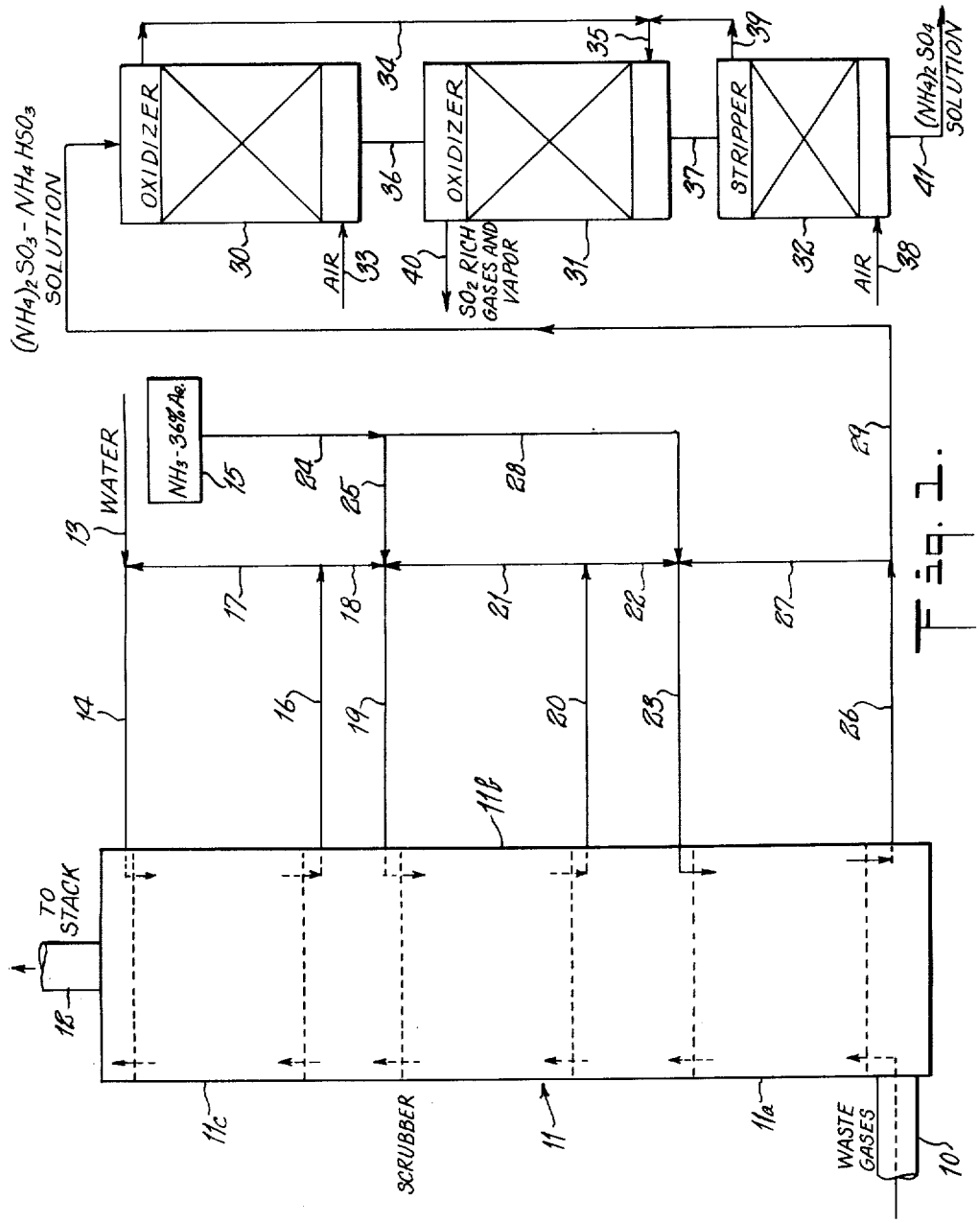

Oct. 22, 1957 H. F. JOHNSTONE ET AL 2,810,627
RECOVERY OF SULFUR DIOXIDE FROM GASES
AND PRODUCTION OF AMMONIUM SULPHATE
Filed Feb. 26, 1953 2 Sheets-Sheet 2

INVENTORS
HENRY F. JOHNSTONE and
WILLIAM E. WEST, JR.
BY
Kenyon & Kenyon
ATTORNEYS

United States Patent Office 2,810,627
Patented Oct. 22, 1957

2,810,627

RECOVERY OF SULFUR DIOXIDE FROM GASES AND PRODUCTION OF AMMONIUM SULPHATE

Henry F. Johnstone, Urbana, and William E. West, Jr., Champaign, Ill., assignors to Texas Gulf Sulphur Company, New York, N. Y., a corporation of Texas Application February 26, 1953, Serial No. 339,046

14 Claims. (Cl. 23—119)

This invention relates to the recovery of sulfur dioxide from gases and relates especially to the recovery of sulfur dioxide from waste gases such as those resulting from the combustion of sulfur-containing coal or from the roasting or sintering of sulfur-containing materials as in ore refining processes.

The recovery of sulfur dioxide from waste gases is commercially important not only from the standpoint of minimizing polution problems but also from the standpoint of conservation of sulfur resources. At the present time there is a prevailing shortage of sulfur resulting from increased demand and diminishing resources of brimstone in the United States. On the other hand, it has been estimated that the amount of sulfur dioxide which is emitted to the atmosphere in waste combustion gases exceeds the total quantity of sulfur consumed. It is apparent, therefore, that the sulfur dioxide contained in such waste gases offers a potential source of sulfur whose utilization is a matter of great commercial significance provided that recovery of the sulfur in a useful form may be accomplished by methods and equipment such that the cost for thereby producing a sulfur-containing product or sulfur-containing products is competitive with or less than the cost of producing such product or products from other sources of sulfur. The nature of the sulfur-containing product or products produced is also a significant factor not only from the standpoint of the inherent commercial value of the product or products in question but also from the standpoint of availability of markets therefor without entailing unduly high shipping costs.

The sulfur dioxide contained in waste gases from power plants exceeds that in all other forms of waste gases, but in the waste gases from power plants the sulfur dioxide content is relatively low, the proportion being dependent principally upon the sulfur content of the coal consumed. An increasing percentage of the coal consumed in power plants contains more than 4% sulfur and using current combustion methods the stack gases from the combustion of such coal contains about 0.4% by volume of sulfur dioxide or a somewhat higher percentage. One of the objects of this invention is, therefore, to provide an improved process whereby sulfur dioxide can be successfully recovered in a practical and economically feasible manner from such waste gases or even from waste gases containing a substantially lesser content of sulfur dioxide such as 0.1% or 0.2% by volume. However, the process of this invention likewise is of utility in the recovery of sulfur dioxide from waste gases which contain higher proportions of sulfur dioxide such as those containing about 0.7% to about 0.8% by volume of sulfur dioxide which are produced in a lead sintering operation or those containing about 5% to about 6% by volume of sulfur dioxide produced in a zinc roasting operation. More generally, any waste combustion gases containing a substantial proportion of sulfur dioxide provide a potential source for the recovery of sulfur dioxide therefrom according to this invention. However, the method of this invention is particularly suited for the recovery of sulfur dioxide from relatively dilute waste gases containing up to about 3% by volume of sulfur dioxide.

Of the possible absorbents which may be utilized for the absorption of sulfur dioxide from waste gases, ammoniacal solutions have certain distinct advantages due to the fact that, because of the high order of solubility of the ammonium compounds produced by absorption of sulfur dioxide, the ammoniacal solution may be used in such concentrations as to have a large capacity for absorbing sulfur dioxide from the waste gases. When sulfur dioxide is absorbed by an ammoniacal solution sulfur dioxide may react with the ammonia contained in the solution to form ammonium sulfite or ammonium bisulfite and ordinarily the result of the absorption is to produce both ammonium sulfite and ammonium bisulfite, the relative proportions thereof being dependent on such factors as the concentration of the ammonia in the ammoniacal solution which is available for reaction with sulfur dioxide, the concentration of the sulfur dioxide in the waste gases that are contacted with the ammoniacal solution, the temperature at which the absorption is carried out and the extent to which equilibrium conditions are approached in carrying out the absorption. For convenience in reference herein and in the claims the term "ammonium sulfite compound" is used generally as applicable to ammonium sulfite, to ammonium bisulfite and to ammonium sulfite-bisulfite mixtures.

The relative proportion of ammonium sulfite and of ammonium bisulfite in a solution of ammonium sulfite compound produced by the reaction of sulfiur dioxide in waste gases with ammonia in an ammoniacal solution contacted therewith may be expressed in terms of the ratio of concentration of the available ammonia, i. e., ammonia available for reaction with the sulfur dioxide, to the concentration of the sulfur dioxide, each of those concentrations being in terms of mols per 100 mols of water. The concentration of the available ammonia in terms of mols of ammonia per 100 mols of water is designated herein as $C_a$ and is to be distinguished from the concentration of the total ammonia which, as expressed in terms of mols per 100 mols of water, is designated herein as $C_t$. Under the conditions prevailing during absorption of sulfur dioxide by an ammoniacal solution some of the sulfur dioxide becomes oxidized to sulfur trioxide which in the aqueous medium becomes converted to sulfuric acid that in turn reacts with ammonia in the ammoniacal solution to produce ammonium sulfate, and to the extent that part of the ammonia in the ammoniacal solution becomes converted to ammonium sulfate, such quantity of the total ammonia ($C_t$) is rendered unavailable for forming a solution of ammonium sulfite compound from which sulfur dioxide may be regenerated in a usable form. To the extent that ammonium sulfate is so produced there is a recovery of sulfur dioxide from the original stack gases in the form of ammonium sulfate, which is a product having commercial value. However, the amount of the sulfur dioxide in the waste gases that becomes oxidized during the absorption of the sulfur dioxide by the ammoniacal solution is relatively small, and, by way of example may run approximately 9% of the total amount of sulfur dioxide that is removed from the waste gases. Consequently the bulk of sulfur dioxide removed from the waste gases is absorbed by the ammoniacal solution in the form of ammonium sulfite compound.

The concentration of the sulfur dioxide in terms of mols of sulfur dioxide per 100 mols of water that is absorbed by the ammoniacal solution by its reaction with ammonia to form ammonium sulfite compound, as distinguished from ammonium sulfate, is designated herein as S. If ammonium sulfite compound is in the form of ammonium sulfite $(NH_4)_2SO_3$, it is apparent that there are two mols of ammonia per mol of absorbed sulfur dioxide and in such case the value of the ratio $S/C_a$ is 0.5. On the other hand for ammonium bisulfite $NH_4HSO_3$, the value of the ratio $S/C_a$ is 1. Ordinarily, under the conditions for the absorption of sulfur dioxide from waste gases by contacting the waste gases with an ammoniacal solution, the proportion of ammonium sulfite to ammonium bisulfite preferably is such that the value of the ratio of $S/C_a$ is in the neighborhood of about .7 to about .9 or even somewhat higher, depending on the concentration of the sulfur dioxide in the waste gases, on the concentration of the ammonia in the solution, and on the temperature of the solution. In the practice of this invention it is preferable to carry out the absorption of the sulfur dioxide from the waste gases so that the ratio of $S/C_a$ is relatively high, for by so doing the proportion of the sulfur dioxide that is recoverable as such, as distinguished from ammonium sulfate, is correspondingly greater.

It has heretofore been proposed to treat the effluent solution resulting from the absorption of sulfur dioxide in an ammoniacal solution with an amount of sulfuric acid that is adapted to react with the ammonium sulfite compound contained in the effluent solution so as to form ammonium sulfate and sulfur dioxide. In such case the liberation of the sulfur dioxide that is formed in the solution has been effected by heating the solution, the heating usually being effected by means of steam which may be used either in direct or indirect heat exchange relation with the solution. After the sulfur dioxide has been separated from the solution, the ammonium sulfate in the solution may be recovered by crystallization, as by evaporation of water from the solution in an evaporator-crystallizer wherein evaporation of the water is accelerated by heating the solution as by indirect heat exchange with steam.

According to this invention the release of sulfur dioxide and the recovery of ammonium sulfate are accomplished, after a solution of ammonium sulfite compound has been produced by absorption of sulfur dioxide contained in waste gases in an ammoniacal solution, by oxidizing the ammonium sulfite compound in the solution with elemental oxygen. By so doing the sulfite radical comprised in the ammonium sulfite compound is converted to sulfate and sulfur dioxide is formed which can be readily stripped from the solution. The ammonium sulfate that is produced by oxidation of the sulfite radical to sulfate can likewise be recovered as by effecting its crystallization from the solution. The amount of sulfur dioxide that is formed and that is recoverable as such by stripping from the solution depends on the aforesaid ratio of $S/C_a$, the amount of sulfur dioxide that is formed being greater as the ratio of $S/C_a$ becomes greater; and when it is desired to have the proportion of sulfur dioxide that is recovered as such approach the maximum in relation to the amount of ammonium sulfate that is produced, then the initial absorption of the sulfur dioxide from the waste gases should be carried out under those conditions which favor a high value for the ratio of $S/C_a$ and which minimize oxidation of the sulfur dioxide contained in the waste gases during the initial absorption step.

The oxidation with elemental oxygen can be accomplished utilizing an oxygen-containing gas by contacting it with the effluent solution from the absorption step. Air may be conveniently used for the purpose. Also substantially pure oxygen may be used. When air is used, the inert constituents thereof dilute the sulfur dioxide that is recovered, but for certain purposes such as sulfuric acid manufacture, such dilution is not disadvantageous. If substantially pure oxygen is used as the oxygen-containing gas, then sulfur dioxide may be recovered in substantially pure form.

When the effluent solution comprising ammonium sulfite compound is contacted with the oxygen-containing gas with resultant oxidation of the ammonium sulfite compound, the reaction is exothermic and this fact is utilized in that the resultant elevation in temperature increases the vapor pressure of the sulfur dioxide that is produced by the oxidation reaction, thereby facilitating the separation of the sulfur dioxide from the solution. The conversion of the sulfite radical to sulfate likewise increases the vapor pressure of the sulfur dioxide and facilitates its separation from the solution. Because of the increase in the vapor pressure of the sulfur dioxide resulting from the oxidation step, the sulfur dioxide may be effectively stripped from the solution merely by the passage of air through the solution when air is used as the oxygen-containing gas. If substantially pure oxygen is employed which becomes substantially completely utilized in oxidizing the sulfite to sulfate, then, if desired, stripping of the sulfur dioxide from the solution may be facilitated as by use of steam, but even in such case the solution becomes heated as a result of the oxidation, and a high degree of efficiency is obtained in using the steam for the purpose of assisting the separation of the sulfur dioxide from the solution.

It is preferable to carry out the operation in a plurality of zones. Thus the solution of ammonium sulfite compound may be subjected to the oxidation of the ammonium sulfite compound comprised therein in an oxidizing zone and the resulting solution of ammonium sulfate containing dissolved sulfur dioxide may be directed to a stripping zone wherein the sulfur dioxide is stripped therefrom. When oxidation is effected with substantially pure oxygen, a single oxidizing zone and a single stripping zone may conveniently be employed. In the case of oxidation with an oxygen-containing gas such as air, the zone or zones in which the oxidation take place is referred to as the oxidizing zone or zones even though some stripping of sulfur dioxide occurs therein as the result of passage of the air through the solution, and in combination with such oxidizing zone or zones there is preferably employed a zone which functions primarily as a stripping zone. When an oxygen-containing gas such as air is employed, it is preferable to carry out the oxidation of the ammonium sulfite compound in two zones through which air is successively passed, and to likewise employ a stripping zone through which an additional quantity of air is passed, the additional air being used primarily for stripping in the stripping zone and thereafter being directed into the second of the oxidizing zones so that it also may be utilized to effect oxidation of ammonium sulfite compound.

The oxidation method of this invention has distinct advantages as compared with the treatment of effluent scrubber solution with sulfuric acid. In a typical operation using the sulfuric acid acidification method about 2 mols of sulfuric acid are required in order to react with the ammonium sulfite compound comprised in the effluent solution to produce 3 mols of sulfur dioxide. Since the sulfuric acid used in the system in order to liberate the sulfur dioxide ordinarily is produced in a sulfuric acid plant utilizing sulfur dioxide formed by reaction of sulfuric acid with the ammonium sulfite compound in the effluent solution from the scrubber, it is apparent that for each 3 mols of sulfur dioxide resulting from acidification of ammonium sulfite compound with sulfuric acid about 2 mols of sulfur dioxide so released are reintroduced into the system by conversion to the sulfuric acid employed in the acidification step. It is also apparent that the cost of the sulfuric acid plant and the conversion of sulfur dioxide to sulfuric acid therein is a substantial item in the overall economy of the system. By the oxidation process of this invention the conversion of recovered sulfur dioxide to sulfuric acid merely for the purpose of acidifying the effluent solution can be entirely eliminated. While the sulfur dioxide that is recovered as such according to this invention may, if desired, be converted into sulfuric acid, the entire quantity of sulfuric acid that is so produced is available for sale on the market and the size of the sulfuric acid plant required for such usage of the sulfur dioxide which is recovered as such need be only about one-third to one-half that which is necessary when that type of operation is employed wherein sulfuric acid is introduced into the system for reaction with the ammonium sulfite compound contained in the scrubber effluent.

It is also the case in the operation wherein the scrubber effluent is acidified with sulfuric acid to produce ammonium sulfate and sulfur dioxide there are substantial heat requirements for separating the sulfur dioxide from the ammonium sulfate solution, and for evaporating water from the ammonium sulfate solution so as to facilitate the crystallization of ammonium sulfate therefrom. Usually the heat requirements for this purpose are supplied by steam furnished from an outside source. By utilizing the oxidation process very substantial savings as regards heat supply are realized as the result of the exothermic nature of the reaction. Moreover, in the case of an oxygen-containing gas such as air, the passage of the air through the solution accelerates the stripping of sulfur dioxide from the solution and likewise carries with it a substantial amount of water as water vapor, and these likewise are factors in the overall economy both as regards the heat energy required for effecting the stripping and the heat energy required for evaporating water from the ammonium sulfate solution so as to facilitate crystallization of ammonium sulfate therefrom.

Figure 2:
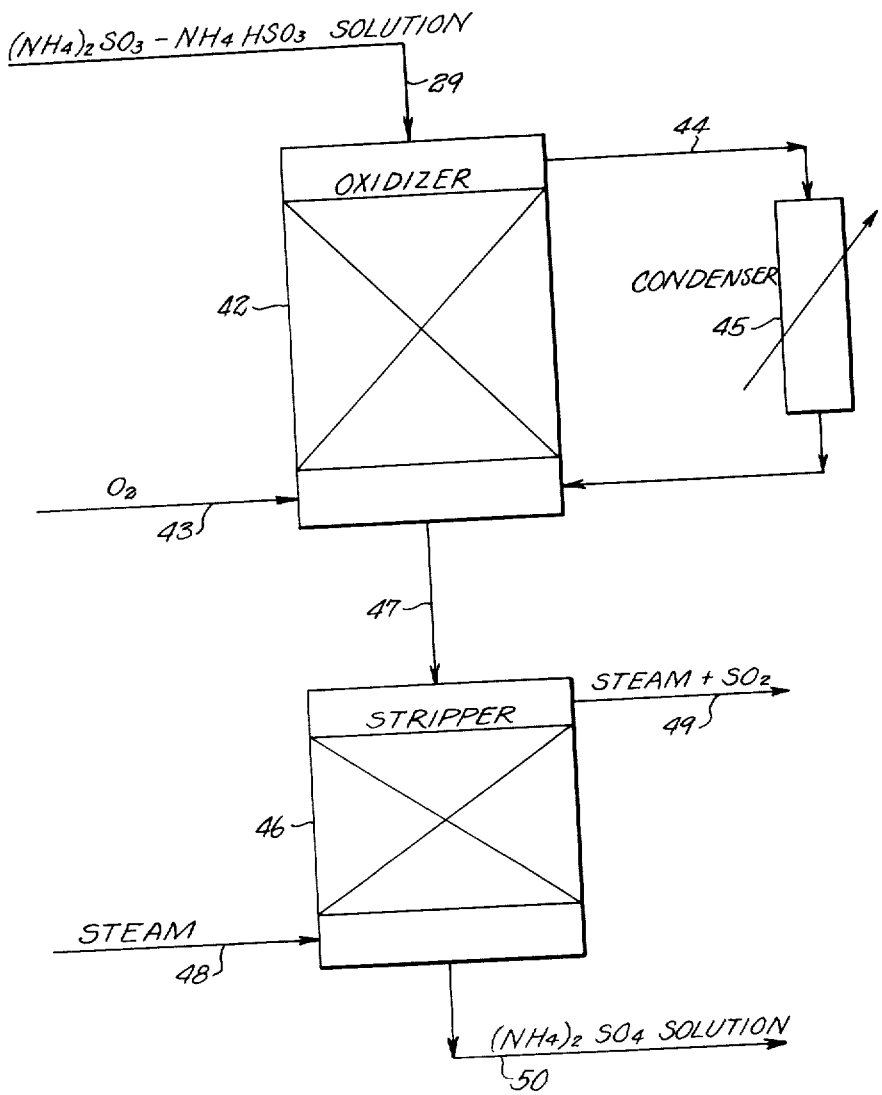

The foregoing, as well as other purposes, features and advantages of the invention will be apparent from the following illustrative examples of the practice of this invention which are described below in connection with the accompanying drawings, wherein:

Fig. 1 is a flow sheet illustrating preferred practice of this invention wherein a solution of ammonium sulfite compound resulting from absorption of sulfur dioxide from waste gases is subjected to oxidation utilizing air as the oxygen-containing gas, and Fig. 2 is a flow sheet illustrating preferred practice of this invention utilizing substantially pure oxygen as the oxygen-containing gas.

In Fig. 1 a complete system is shown wherein sulfur dioxide is removed from waste gases by absorption in an ammoniacal solution to form a solution comprising ammonium sulphite compound and wherein the solution comprising the ammonium sulphite compound is treated so as to subject the ammonium sulphite compound to oxidation using air as the oxygen-containing gas whereby sulfur dioxide and ammonium sulphate are recoverable as the end products. This invention is concerned primarily with the recovery of sulfur dioxide and ammonium sulphate from a solution comprising ammonium sulphite compound and can be employed without regard to the particular manner by which the solution comprising the ammonium sulphite compound is produced by absorption of sulfur dioxide from waste gases in an ammoniacal solution. However, for purposes of exemplification a desirable type of operation for absorption of the sulfur dioxide from the waste gases is described below in connection with Fig. 1.

The waste gases are introduced by the gas conduit 10 into the scrubber which is indicated generally by the reference character 11 and from the top of which they are passed by the gas line 12 to a stack for discharge to the atmosphere. The waste gases may contain about 0.4% by volume of sulfur dioxide and may be passed through the scrubber so that the liquid rate of the ammoniacal solution in relation to the flow of gases contacted therewith may, for example, be 3 gallons per 1000 cu. feet of gas. However, for better indicating the molar relationships the following description is in terms of mols and in terms of concentrations expressed as mole per 100 mols of water, the mol quantities stated below indicating flow quantities in terms of mols per unit of time.

The waste gases that enter the scrubber by the gas line 10 are such as to introduce into the system 170 mols of inert gas, 28.6 mols of water in the form of water vapor and 0.80 mol of sulfur dioxide, the wet bulb temperature being about 128° F. The scrubber system is designed to absorb about 80% of the sulfur dioxide from the waste gases with the result that 0.160 mol of sulfur dioxide is passed from the scrubber 11 by the line 12. The gases leaving through the line 12 contain the same amount of inert gas and water vapor as the entering gases, namely, 170 mols of inert gas and 28.6 mols of water vapor.

Preferably the waste gases are brought into contact with ammoniacal solution in a plurality of zones. For example, the scrubber 11 has been shown as comprising the three zones 11a, 11b and 11c. Each zone of the scrubber as such has to provide intimate contact between the waste gases and the ammoniacal solution which is caused to flow through the respective zones. Any suitable construction may be employed for providing intimate contact between the gases and the ammoniacal solution in the respective zones of the scrubber. For example, each of the zones may be of the grid packed tower construction whereby the ammoniacal solution is caused to come into intimate contact with the waste gases and in counterflow thereto in each zone of the scrubber. According to the present example 50% of the sulfur dioxide contained in the entering gases is absorbed in zone 11a of the scrubber, while 25% and 5% of the sulfur dioxide contained in the entering gases are absorbed in zones 11b and 11c, respectively. This differential absorption of sulfur dioxide in the different zones is afforded by causing the concentration of the available ammonia in the ammoniacal solution to be different in the different zones of the scrubber, such concentration of the ammonia being greatest in zone 11a and least in zone 11c, while an intermediate concentration of available ammonia is maintained in zone 11b. The term "available" ammonia as used herein refers to the ammonium ions in the ammoniacal solution which are available to form ammonium sulphite or ammonium bisulphite by reaction with sulfur dioxide in the waste gases. The available ammonia includes the ammonium ions which are combined with sulfur dioxide in the form of ammonium sulphite or ammonium bisulphite, but does not include ammonium ions which have become inactive as the result of the formation of ammonium sulphate or possibly some other salt or salts other than ammonium sulphite or bisulphite. As mentioned above the symbol $C_a$ indicates the concentration of the available ammonia in terms of mols per 100 mols of water while the symbol $C_t$ refers to the total ammonia including both the available ammonia and any ammonia that has become unavailable as the result of having become combined in the form of ammonium sulphate, for example.

In each of the zones of the scrubber 11 the ammoniacal solution is caused to be circulated therethrough so that in the entering solution and in the leaving solution there will be 100 mols of water relative to the mols of the constituents of the waste gases in contact therewith in the different zones. Accordingly, the concentrations below mentioned which are in terms of mols per 100 mols of water indicate the content in mols of the constituents of these solutions as well as the flow quantities in terms of mols per unit of time.

2.15 mols of water are introduced into zone 11c of the scrubber by the lines 13 and 14 and 0.873 mol of ammonia is fed into the scrubber portion of the system from the ammonia supply source 15; and since the ammonia is comprised in a 36% by weight aqueous ammonia solution about 1.45 mols of water are fed into the scrubber portion of the system from this source. Ammoniacal scrubbing solution is recirculated in each zone of the scrubber. Thus, with reference to zone 11c, 97.9% of the effluent taken from this zone by the line 16 is directed by the line 17 for reentry in zone 11c through the line 14, and 2.1% of the effluent from the zone 11c is directed into the zone 11b of the scrubber by the lines 18 and 19. 97.5% of the solution leaving the zone 11b by the line 20 is returned to this zone by the lines 21 and 19, and 2.5% of this effluent is directed to the zone 11a by the lines 22 and 23. 23% of the aqueous ammonia from the aqueous ammonia supply source 15 is also caused to enter zone 11b by the lines 24, 25 and 19. 96.4% of the solution leaving the zone 11a by the effluent line 26 is returned thereto by the lines 27 and 23 and 77% of the aqueous ammonia from the aqueous ammonia supply source 15 is also directed into the zone 11a by the lines 24, 28 and 23.

While the wet bulb temperature of the waste gases that enter the scrubber 11 is about 128° F., the conditions of the reaction are such that the equilibrium temperatures prevailing in the zones 11a, 11b and 11c are about 140° F., 135° F. and 129° F., respectively. The values of the partial pressures of sulfur dioxide for equilibrium with the ammoniacal solution in each of the zones 11a, 11b and 11c are substantially below the partial pressure of the sulfur dioxide in the waste gases in each of the zones, so that absorption of sulfur dioxide takes place readily in each of the zones. By carrying out the scrubbing in three zones through which ammoniacal solution is circulated in the manner above described, the value of the partial pressure of ammonia for equilibrium with ammoniacal solution which enters zone 11c in contact with the leaving gases is only about 0.007 mm. so that ammonia losses to the stack are slight, namely, about 0.008 mol.

The foregoing has been described as constituting one way of absorbing sulfur dioxide from waste gases so as to provide a relatively concentrated solution of ammonium sulfite compound wherein the value of the ratio $S/C_a$ is relatively high. Thus, in the example, the effluent which leaves the zone 11a of the scrubber by the line 26 is such that the concentration of available ammonia ($C_a$) is about 20.8 mols per 100 mols of water and the concentration of sulfur dioxide is about 16.1 mols per 100 mols of water, the value of the ratio $S/C_a$ being about 0.772. During the scrubbing operation about 9% of the sulfur dioxide which is absorbed by the ammoniacal solution becomes oxidized with resultant formation of ammonium sulfate, the concentration of which in the solution leaving zone 11a of the scrubber is about 1.6 mols per 100 mols of water. The concentration of the total ammonia in the solution leaving zone 11a of the scrubber is about 24.0 mols per 100 mols of water.

The production of sulfur dioxide and ammonium sulfate according to this invention will now be exemplified in connection with the treatment of the scrubber effluent whose constituents and the concentration thereof are as above stated. The foregoing description of the exemplified scrubbing operation whereby this effluent is produced was in terms of molar quantities per unit of time and on the basis of concentrations expressed in terms of mols per 100 mols of water. Also the flow rate maintained for the solution entering and leaving each zone of the scrubber was on the basis of 100 mols of water. It was also mentioned that 96.4% of the solution leaving zone 11a of the scrubber by the line 26 is recirculated into this zone by the lines 27 and 23. Accordingly, 3.6% of effluent solution leaving zone 11a of the scrubber is taken by the line 29 for further treatment whereby sulfur dioxide and ammonium sulfate are produced therefrom. However, for the purpose of facilitating the following description of this further treatment according to this invention, the solution taken from the scrubber unit by the line 29 is regarded merely as a source of supply of the solution and on the basis of 100 mols of water being furnished by this source of supply so that the foregoing concentrations of the constituents of the solution in terms of mols per 100 mols of water will indicate the content in mols of the constituents of the solution relative to the mols of air and oxygen brought into contact therewith per unit of time in effecting the oxidation of the ammonium sulfite compound comprised in the solution as well as flow quantities.

According to the example of this invention, as illustrated in connection with the flow sheet of Fig. 1, air is used to oxidize the ammonium sulfite compound comprised in the effluent supplied by the scrubber. The result of the oxidation is that the ammonium sulfite compound comprised in the scrubber effluent becomes converted to ammonium sulfate and sulfur dioxide. The sulfur dioxide is taken off with the air which remains after removal of part of the oxygen content thereof that is used in effecting the oxidation and which when removed contains a substantial amount of water vapor. The residual solution contains the ammonium sulfate which can be recovered therefrom as by crystallization. In effecting this result the total oxidation is controlled so for each two mols of available ammonia comprised in the ammonium sulfite compound contained in the solution one mol of sulfate $(SO_4)^=$ is produced. The sulfur dioxide which remains unoxidized is that which is stripped off as such with the exit gases.

According to the present example the supply of air is controlled so that when the oxidation is effected as above described the exit gases will contain about 8% of sulfur dioxide on the dry basis. This concentration of sulfur dioxide is appropriate in that the exit gases can be used directly for the manufacture of sulfuric acid by conventional methods.

Considering the oxidation operation as a whole according to the present example, the following quantitative relationships prevail. The amount of sulfur dioxide which is oxidized to sulfate is 10.4 mols, since, as stated above, the concentration of available ammonia in the solution is 20.8 mols per 100 mols of water and since one mol of sulfate is produced by the oxidation for each two mols of available ammonia. In other words, the sulfur dioxide oxidized is $C_a/2$. The balance of the sulfur dioxide is released and taken off in the exit gases and this amounts to 5.7 mols, namely, the difference between the aforesaid total sulfur dioxide concentration(s) of 16.1 mols and the 10.4 mols of sulfur dioxide that are oxidized to sulfate.

Since the sulfite of the ammonium sulfite compound becomes oxidized to sulfate by the reactions $$SO_3^= + \tfrac{1}{2}O_2 \rightarrow SO_4^=$$

and $$2HSO_3^- + \tfrac{1}{2}O_2 \rightarrow SO_4^= + SO_2 + H_2O$$

the amount of oxygen used in effecting the oxidation of the 10.4 mols of sulfur dioxide which is oxidized is one-half this molar quantity, i. e., 5.2 mols of $O_2$.

In order for the concentration of the sulfur dioxide in the exit gases to be about 8% by weight on the dry basis, the rate of air supplied for effecting the oxidation is $(92/8) \times$ (mols sulfur dioxide released) plus the mols of $O_2$ used, i. e., 70.7 mols. As a corollary the amount of oxygen in the air supplied is $(0.209) \times$ (air rate), i. e. 14.8 mols.

Under the conditions prevailing the heat liberated as the result of the oxidation reaction is substantial and is such as to cause vaporization of water from the solution so that in the exit gases there will be about 10 mols of steam per mol of $O_2$ used in the oxidation; and since 5.2 mols of oxygen are used according to this example there are about 52 mols of water vapor in the exit gases.

The composition of the exit gases as above described is summarized in the following table:

| Constituents | Mols | Percent Wet | Percent Dry |
|---|---|---|---|
| $SO_2$ | 5.7 | 4.63 | 8.0 |
| $O_2$ | 9.6 | 7.8 | 13.5 |
| $H_2O$ Vapor | 52.0 | 42.2 | |
| Inert | 55.9 | 45.4 | 78.5 |
| Total (Wet) | 123.2 | 100 | |
| Total (Dry) | 71.2 | | 100 |

Depending on the conditions prevailing during the oxidation there may be a very small amount of ammonia which is taken off with exit gases, which according to the present example may be about 0.16 mol; and this slight content of ammonia in the exit gas has not been indicated in the giving of the composition of the exit gases as set forth in the foregoing table. Due to the fact that the ammonia comprised in ammonium sulfite compound in the effluent solution becomes comprised in the ammonium sulfate that results from the oxidation, the mols of ammonium sulfate in the solution after the oxidation has been effected is one-half the total concentration of ammonia in the effluent scrubber solution ($C_t/2$) less one-half the 0.16 mol of ammonia that is lost with the exit gases; and since the total ammonia concentration in the scrubber effluent is 24.0 mols per 100 mols of water, it follows that slightly less than 12 mols (about 11.92 mols) of ammonium sulfate are produced. This includes the 1.6 mols of ammonium sulfate that are contained in the scrubber effluent prior to the oxidation treatment. The foregoing represents mols of ammonium sulfate produced rather than concentration per 100 mols of water for the solution concentration becomes increased due to removal of water vapor with the exit gases.

The oxidation treatment of the scrubber effluent for producing the reaction products as above exemplified is preferably carried out as indicated by the flow sheet of Fig. 1. Thus, the oxidation is effected in the oxidizing zones provided by the towers 30 and 31. The tower 32 is used as a final stripping zone. Any suitable tower construction may be employed which provides intimate contact of the scrubber effluent solution with the oxygen-containing gas. Thus, a grid packed tower may be employed wherein the oxygen-containing gas is caused to travel in counter-current with the scrubber effluent. However, other means for establishing intimate contact may be employed such as spray contact, or aeration.

The scrubber effluent solution is directed to the upper portion of the tower 30 by the line 29 and air is introduced into the tower 30 adjacent the bottom thereof by the line 33. The air after travel in contact with the solution in tower 30 is taken therefrom by the line 34 and is introduced into the tower 31 adjacent the bottom thereof by the line 35. The solution after partial oxidation of the ammonium sulfite compound in tower 30, which now contains some dissolved sulfur dioxide, is taken by the line 36 from adjacent the bottom of tower 30 and is introduced into the upper portion of the tower 31 wherein the oxidation becomes completed. After completion of the oxidation in tower 31 the solution containing ammonium sulfate and dissolved sulfur dioxide is directed from adjacent the bottom of the tower 31 by the line 37 which introduces it into the upper portion of the tower 32 wherein it is contacted with air introduced into the lower portion of the tower 32 by the line 38. After passing through the tower 32 in contact with the solution the air is directed by the lines 39 and 35 into the lower portion of the tower 31. The gases introduced into the tower 31 are taken from the upper portion thereof by the exit line 40. Ammonium sulfate solution is taken from the bottom of the stripping tower 32 by the line 41.

In tower 30 the ammonium sulfite compound comprised in the scrubber effluent is partially oxidized with resultant heating of the solution and decreasing of the $(SO_3)^=$ ion concentration, both of which have the effect of increasing the partial pressure of the sulfur dioxide in the solution. About 20 mols of air are introduced into the tower 30 and about 2 mols of $O_2$ are used therein in oxidizing about 4.01 mols of $(SO_3)^=$. The air which leaves tower 30 by line 34 contains only a very low percentage of sulfur dioxide and ammonia. As a result of the oxidation that occurs in tower 30, the solution which leaves tower 30 by the line 36 is such that the concentration of available ammonia ($C_a$) is about 12.78 mols per 100 mols of water and that the concentration of sulfur dioxide (S) is about 12.09 mols per 100 mols of water.

The exit gas from towers 30 and 32 are mixed and the oxygen contained therein is used to complete the remainder of the desired oxidation in tower 31. At the same time the gas is enriched with sulfur dioxide until it approaches the vapor pressure of the solution entering tower 31 by the line 36. As a result of heat generated by the oxidation in towers 30 and 31 in relation to the water vapor taken off with the exit gases, the solution becomes heated to about 86° C. at the top of the tower 31. The solution leaving tower 31 consists essentially of ammonium sulfate and contains some dissolved sulfur dioxide.

In tower 32 the balance of the air is supplied, i. e., about 50.7 mols, and in being passed through the solution in this tower it serves to strip the dissolved sulfur dioxide therefrom leaving a nearly neutral solution of ammonium sulfate. At the same time the air is heated and humidified as it strips the sulfur dioxide from the solution in tower 32. It is to be noted that the air used in the oxidation is also used to effect the stripping and that no supply of heat from an outside source is required.

The composition of the exit gases which leave the tower 31 by the line 40 has been given hereinabove. The water vapor content thereof can be removed, if desired, as by passing the hot gases through a condenser.

As a result of the removal of about 52 mols of water as water vapor with the exit gases leaving tower 31, it is apparent that the ammonium sulfate solution that is discharged from tower 32 by the line 41 is highly concentrated. It likewise is at elevated temperature, and, as a result, the ammonium sulfate contained therein can be readily crystallized therefrom upon cooling and with the requirements for evaporation of water therefrom and supply of additional heat to effect such evaporation reduced to a minimum.

If it is desired to produce sulfur dioxide in more concentrated form this may be accomplished by utilizing oxygen-containing gas which contains a higher percentage of oxygen than air, and for some purposes, such as production of liquid sulfur dioxide, bisulfite solution for a paper mill or some sufur dioxide products, it is preferable to oxidize utilizing substantially pure oxygen. In such case the oxidation may be accomplished using much smaller equipment than is appropriate when an oxygen-containing gas such as air is employed. However, there are the offsetting factors resulting from the increased cost of supplying $O_2$ and from the fact that steam is needed to effect stripping of the dissolved sulfur dioxide from the ammonium sulfate solution that is produced.

The employment of oxygen as the oxygen-containing gas is illustrated in connection with Fig. 2. The scrubber effluent solution that is subjected to oxidation may be the same as exemplified hereinabove in connection with Fig. 1, and the oxidation may be carried out to the extent and for the purposes hereinabove described for the production of ammonium sulfate and sulfur dioxide. The scrubber effluent solution is fed into the oxidizer tower 42 by the line 29 that is connected to a suitable scrubber unit such as that described hereinabove in connection with Fig. 1. The $O_2$ is fed into the lower portion of the tower 42 by the line 43 at the rate hereinabove stated for effecting the desired oxidation and it is contacted with the scrubber effluent solution in the tower 42. The heat produced by the oxidation reaction is more than sufficient to heat the solution to a desired stripping temperature and it is necessary to remove the excess heat. One way of removing the excess heat is to provide an oxidizer of such size that not all of the oxygen is absorbed in a single pass, the unused oxygen together with water vapor and a small amount of ammonia and sulfur dioxide being circulated by the line 44 through the condenser 45. By such removal of excess heat a high gas rate through the solution is obtained thereby permitting the use of a small size oxidizer. Alternatively, other cooling means may be employed such as the provision of a cooling coil in the oxidizer. In such case substantially all of the $O_2$ could be absorbed in a single pass and the recycling of the $O_2$ would not be required. When the oxidation is carried out using substantially pure oxygen, the oxidation may be carried out under substantially superatmospheric pressure. In such case, the condensing temperature and heat of vaporization of the vapor leaving the oxidizer 42 by the line 44 may be caused to be sufficiently high so that if the vapor leaving the oxidizer 42 is directed into indirect out-of-contact heat exchange with the solution in the stripper 46 before its entry into the condenser 45, the solution in the stripper can be maintained at proper stripping temperature as a result of the condensation of at least part of said vapor and it is possible to eliminate entirely the use of outside steam.

Oxidation is completed in the oxidizer 42 and the resulting solution which now consists essentially of ammonium sulfate and dissolved sulfur dioxide is directed from the oxidizer 42 to the stripper 46 by the line 47.

The solution which is introduced into the stripper 46 may have the sulfur dioxide stripped therefrom as by passing steam through the solution which is introduced adjacent the bottom of the stripper 46 by the line 48. The steam is taken off by the exit line 49 and carries the stripped sulfur dioxide therewith leaving a substantially neutral solution of ammonium sulfate which is taken from the stripper by the line 50. For a scrubber effluent such as that exemplified in connection with Fig. 1, yields of sulfur dioxide and of ammonium sulfate are obtained corresponding to those exemplified above in connection with Fig. 1. However, when substantially pure oxygen is employed as illustrated in connection with Fig. 2, the steam taken off through the exit line 49 can be readily condensed thus providing substantially pure sulfur dioxide. The ammonium sulfate in the solution removed by the line 50 may be recovered by crystallization from solution in any desired way.

While the practice of this invention has been described in connection with certain examples of the practice thereof, it is to be understood that this has been done merely for purposes of illustration and that the practice of this invention may be substantially varied as compared with the foregoing examples. Thus, the oxidation may be effected in connection with particular solutions which do not have the particular composition above exemplified so long as the solution contains ammonium sulfite compound such as that which results from absorption of sulfur dioxide from waste gases by an ammoniacal solution. However, for effective production of sulfur dioxide as such as the result of the oxidation the solution should contain a substantial proportion of ammonium bisulfite as well as ammonium sulfite. In other words the value of the ratio S/Ca should be substantially greater than 0.5.

The composition of a scrubber effluent resulting from absorption of sulfur dioxide in an ammoniacal solution depends on a number of factors as has been mentioned hereinabove. Among these factors are the temperature and water vapor content of the waste gases. Thus if the gases have been subjected to cooling and dehumidification so that the wet bulb temperature is about 90° F., a scrubber effluent can be obtained wherein the concentrations are sustantially greater as compared with those of the effluent that is obtained when the wet bulb temperature of the gases is about 128° F., as in the example above described. However, when the oxidation is carried out using an oxygen-containing gas such as air, the water vapor that is removed from the solution with the exit gases results in such increase in the concentration of the ammonium sulfate solution that is produced as to result in crystallization of the ammonium sulfate in the oxidizing region of the system unless the crystallization is counteracted by supplying water from an outside source; and when the oxidation is carried out using an oxygen-containing gas such as air, no advantage is gained in cooling and dehumidifying the waste gases prior to the scrubbing step. On the other hand, when the oxidation is carried out using substantially pure oxygen, there is no loss of water vapor with exit gases and possible crystallization of ammonium sulfate in the oxidizer is not a factor.

The concentration of the scrubber effluent is also affected by the amount of sulfur dioxide in the waste gases, being greater in the case of waste gases having a relatively high sulfur dioxide content, and considerations similar to those above mentioned are applicable as regards the concentration of the scrubber effluent as affected by the quantity of sulfur dioxide in the waste gases. It is one of the advantages of this invention that it is well suited for the treatment of scrubber effluents produced by absorption of sulfur dioxide from waste gases that are relatively low in sulfur dioxide content.

The manner of carrying out the oxidation step may likewise be varied. When an oxygen-containing gas such as air is employed, and when the exit gases are to be used directly in the manufacture of sulfuric acid it is normally desirable that the exit gases contain from about 8% to about 10% of sulfur dioxide on the dry basis. However, any recovered gases wherein the amount of sulfur dioxide is over 5% would be useful; and using air as the oxidizing agent any desired concentration of sulfur dioxide in the waste gases may be obtained up to about 20% on the dry basis. Moreover, as above pointed out, by using oxygen-containing gases richer in oxygen than air the proportion of sulfur dioxide can be increased as may be desired.

It is not essential that substantially all of the ammonium sulfite compound in the scrubber effluent be converted to ammonium sulfate and sulfur dioxide during the oxidation step as described above in connection with the foregoing examples. Thus, if, as the result of the oxidation, less than all of the total available ammonia were to be converted to ammonium sulfate, leaving some residual ammonium sulfite compound in the solution removed from the system by the line 41 of Fig. 1 or by the line 50 of Fig. 2, an amount of sulfuric acid could be added which is adapted to react with the residual ammonium sulfite compound and thereby convert it to ammonium sulfate and sulfur dioxide. In such case the sulfur dioxide so produced could be recovered by an additional stripping step. Alternatively, and preferably, if less than all of the available ammonia is converted to ammonium sulfate as the result of the oxidation occurring in the oxidizers 30 and 31 of Fig. 1 or the oxidizer 42 of Fig. 2 so that a substantial amount of residual ammonium sulfite compound is contained in the solution leaving the oxidizer 31 or leaving the oxidizer 42 of Fig. 2, sulfuric acid may be added to the solution in an appropriate amount for reaction with the residual ammonium sulfite compound so as to convert it to ammonium sulfate and sulfur dioxide before the solution enters the stripper 32 of Fig. 1 or the stripper 46 of Fig. 2. In such case the sulfur dioxide produced by the sulfuric acid addition becomes stripped from the solution in the stripper along with the sulfur dioxide that is formed as a result of the oxidation reaction; and it is an advantage that the heat resulting from the oxidation is utilized in effecting the stripping from the solution of both the sulfur dioxide produced as the result of the oxidation and the sulfur dioxide produced as the result of acidification. Moreover, when an oxygen-containing gas such as air is utilized for effecting the oxidation the heat resulting from the oxidation is utilized in concentrating the ammonium sulfate solution due to the fact that a substantial amount of water vapor is carried out with the exit gases. It may also be mentioned that if, in the case of a highly concentrated scrubber effluent, oxidation utilizing an oxygen-containing gas tends to produce ammonium sulfate crystals in the oxidizer due to the amount of water taken off with the exit gases, then a subsequent acidification step affords one way of counteracting such a tendency of crystallization, for in such case the amount of oxidation and incidental heat generation can be reduced so as to avoid any tendency to form ammonium sulfate crystals in the oxidizer and residual ammonium bisulfite compound in the solution can thereafter be converted to ammonium sulfate and sulfur dioxide by the acidification. It also is possible to effect partial conversion of ammonium sulfite compound values contained in the scrubber effluent solution by sulfuric acid acidification at some earlier stage in relation to the oxidation step.

The oxidation that occurs may, if desired, be accelerated by the employment of a catalyst and frequently substances having a catalytic action are picked up from the waste gases during scrubbing. There are a variety of metallic substances which have a catalytic action such as iron, iron oxide, manganese ore, iron sulfate and the like which, if not picked up from the gases, may be added to the solution subjected to oxidation. By thus accelerating the oxidation smaller oxidizers may be utilized. While an added catalyst may be carried into the ammonium sulfate that is produced, its presence does not impair the utility of the ammonium sulfate for fertilizer, for example, which constitutes the principal market for the ammonium sulfate.

We claim:

1. A method which comprises oxidizing sulfite compound contained in an aqueous solution of a mixture of ammonium sulfite and ammonium bisulfite by directing an oxygen-containing gas into contact with said solution in an oxidizing zone with resulting oxidation of said sulfite and bisulfite and formation in said solution of ammonium sulfate and dissolved sulfur dioxide, directing the solution containing the ammonium sulfate and dissolved sulfur dioxide from said oxidizing zone to a stripping zone, stripping from said solution in said stripping zone sulfur dioxide dissolved therein, recovering the sulfur dioxide stripped from said solution in said stripping zone, and directing residual solution containing ammonium sulfate from said stripping zone.

2. A method according to claim 1 wherein the ammonium sulfite compound is only partially oxidized by contact with the oxygen-containing gas in said oxidizing zone and which comprises adding sulfuric acid to said solution containing ammonium sulfate and dissolved sulfur dioxide for reaction with ammonium sulfite compound comprised therein prior to the stripping step.

3. A method which comprises introducing a solution containing ammonium sulfite and ammonium bisulfite into an oxidizing zone, oxidizing ammonium sulfite and ammonium bisulfite comprised in said solution to form ammonium sulfate and sulfur dioxide by passing an oxygen-containing gas countercurrent through said oxidizing zone in contact with said solution, directing residual gas comprising sulfur dioxide and water vapor from said oxidizing zone, directing residual solution containing ammonium sulfate and dissolved sulfur dioxide from said oxidizing zone to a stripping zone, stripping sulfur dioxide from solution in said stripping zone by passing oxygen-containing gas through said stripping zone in contact with solution contained therein, and directing the oxygen-containing gas passed through said stripping zone together with the sulfur dioxide stripped from the solution in said stripping zone so as to be comprised in said oxygen-containing gas passed through the solution in said oxidizing zone.

4. A process for the recovery of sulfur dioxide from waste gases wherein aqueous ammoniacal solution is directed into contact with said gases, sulfur dioxide is absorbed by said solution by reaction with ammonia contained therein to form ammonium sulfite compound dissolved in said solution and effluent solution is separated from said gases which comprises the steps of partially oxidizing said ammonium sulfite compound in said effluent solution to ammonium sulfate and sulfur dioxide with elemental oxygen by directing an oxygen-containing gas into contact with said effluent solution in a first zone, directing solution containing the residual unoxidized ammonium sulfite compound and ammonium sulfate from said first zone to a second zone, oxidizing additional ammonium sulfite compound contained in said solution to ammonium sulfate and sulfur dioxide with elemental oxygen by directing oxygen-containing gas into contact with the solution in said second zone, directing residual solution containing ammonium sulfate and dissolved sulfur dioxide from said second zone to a third zone, stripping sulfur dioxide from solution in said third zone by passage of oxygen-containing gas therethrough, removing the residual ammonium sulfate solution from said third zone, directing the oxygen-containing gas contacted with solution in said third zone from said solution so as to be comprised in said oxygen-containing gas directed into contact with the solution in said second zone, directing the oxygen-containing gas contacted with the solution in said first zone from said solution so as to be comprised in the oxygen-containing gas directed into contact with solution in said second zone, and after said oxygen-containing gas has been contacted with solution in said second zone directing gaseous residue comprising said sulfur dioxide from said second zone.

5. A method according to claim 4 wherein said oxygen-containing gas is air.

6. A method which comprises the steps of directing a solution containing ammonium sulfite and ammonium bisulfite into an oxidizing zone, oxidizing said ammonium sulfite and ammonium bisulfite by directing substantially pure oxygen into said oxidizing zone in contact with said solution with resulting formation of a solution containing ammonium sulfate and dissolved sulfur dioxide, directing said solution containing ammonium sulfate and dissolved sulfur dioxide from said oxidizing zone to a stripping zone, stripping sulfur dioxide from the solution in said stripping zone, removing said sulfur dioxide from said stripping zone, and removing ammonium sulfate-containing solution from said stripping zone.

7. A method according to claim 6 wherein the temperature of the solution in the oxidation zone is controlled by indirect transfer of heat resulting from oxidation of said ammonium sulfite and ammonium bisulfite from said solution to a cooling fluid.

8. A method according to claim 6 wherein said oxygen is contacted with said solution in said oxidizing zone while said oxygen and said solution are maintained under substantial superatmospheric pressure, and wherein vapor under superatmospheric pressure is directed from said oxidizing zone into indirect heat exchange relation with solution in said stripping zone to supply heat to solution in said stripping zone by transfer from said vapor to said solution.

9. A method which comprises introducing a solution of ammonium sulfite compound comprising ammonium sulfite and ammonium bisulfite into a first oxidizing zone, partially oxidizing ammonium sulfite and ammonium bisulfite comprised in said solution to form ammonium sulfate and sulfur dioxide by passing an oxygen-containing gas through said zone in contact with said solution, separating residual gas containing sulfur dioxide and water vapor from residual solution in said first zone containing ammonium sulfate, dissolved sulfur dioxide and residual ammonium sulfite compound, directing said residual solution containing ammonium sulfate, dissolved sulfur dioxide and residual ammonium sulfite compound from said first oxidizing zone into a second oxidizing zone, directing said residual gas containing sulfur dioxide and water vapor from said first oxidizing zone, oxidizing residual ammonium sulfite compound contained in said residual solution directed into said second oxidizing zone to form ammonium sulfate and sulfur dioxide by directing in contact therewith in said second oxidizing zone oxygen-containing gas comprising said residual gas directed from said first oxidizing zone, separating residual gas containing water vapor and sulfur dioxide from said solution in said second oxidizing zone and directing it from said second oxidizing zone, and directing residual solution from said second oxidizing zone and recovering ammonium sulfate therefrom.

10. A method which comprises introducing a solution containing ammonium sulfite compound comprising ammonium sulfite and ammonium bisulfite into a first zone, partially oxidizing said ammonium sulfite compound comprised in said solution to form ammonium sulfate and sulfur dioxide by passing an oxygen-containing gas through said first zone in contact with said solution, directing residual gas comprising sulfur dioxide and water vapor from said first zone, directing residual solution containing ammonium sulfate, ammonium sulfite compound and dissolved sulfur dioxide from said first zone to a second zone, commingling said residual gas comprising sulfur dioxide and water vapor directed from said first zone with additional oxygen-containing gas, passing the commingled residual gas and additional gas through said second zone in contact with said residual solution contained therein, thereby simultaneously oxidizing ammonium sulfite compound remaining in said solution and stripping sulfur dioxide from said solution in said second zone, directing from said second zone residual gases containing water vapor and sulfur dioxide stripped from solution in said second zone, and directing residual solution containing ammonium sulfate from said second zone.

11. In a process for the recovery of sulfur dioxide from waste gases wherein aqueous ammoniacal solution is directed into contact with said gases, sulfur dioxide is absorbed by said solution by reaction with ammonia contained therein to form ammonium sulfite and ammonium bisulfite dissolved in said solution and said solution containing said ammonium sulfite and ammonium bisulfite dissolved therein is separated from said gases, the steps of oxidizing said ammonium sulfite and ammonium bisulfite by contacting said separated solution after its separation from said gases with oxygen containing gases in an oxidizing zone to form ammonium sulfate and sulfur dioxide dissolved in said solution, removing said solution from said oxidizing zone and directing it to a stripping zone, stripping dissolved sulfur dioxide from said solution in said stripping zone, directing sulfur dioxide from said stripping zone, recovering said sulfur dioxide, removing residual solution containing ammonium sulfate from said stripping zone, and recovering ammonium sulfate from said solution.

12. The improvement in a process for the recovery of sulfur dioxide from waste gases wherein ammoniacal solution is directed into contact with said gases, sulfur dioxide is absorbed by said solution by reaction with ammonia contained therein to form ammonium sulfite compound containing ammonium sulfite and ammonium bisulfite dissolved in said solution and said solution containing said ammonium sulfite and ammonium bisulfite dissolved therein is continuously separated from said gases, which comprises the steps of continuously oxidizing with elemental oxygen ammonium sulfite compound comprised in said solution in an oxidizing zone after its separation from said gases to form ammonium sulfate and sulfur dioxide dissolved in said solution, continuously removing solution containing ammonium sulfate and dissolved sulfur dioxide from said oxidizing zone to a stripping zone, continuously stripping sulfur dioxide gas from said solution in said stripping zone and removing it from said stripping zone, recovering the sulfur dioxide gas so stripped and removed from said solution, continuously removing solution containing ammonium sulfate from said stripping zone, and recovering ammonium sulfate from said solution.

13. The process which comprises oxidizing ammonium sulfite compound containing a mixture of ammonium sulfite and ammonium bisulfite contained in an aqueous solution by intimately contacting said solution with oxygen-containing gas with resultant formation of ammonium sulfate and sulfur dioxide and with substantial elevation of the temperature of said solution caused by the heat of the reaction, stripping sulfur dioxide from said solution while its temperature is elevated as aforesaid, and thereafter cooling said solution and separating ammonium sulfate therefrom by crystallization.

14. The process which comprises oxidizing ammonium sulfate compound containing a mixture of ammonium sulfite and ammonium bisulfite contained in an aqueous solution by intimately contacting said solution with gas consisting partially of oxygen with resultant absorption of oxygen and formation of ammonium sulfate and sulfur dioxide dissolved in said solution and with substantial raising of the temperature of said solution caused by the heat of the reaction, stripping from said solution prior to substantial cooling thereof sulfur dioxide together with residual gas remaining after the absorption of said oxygen, a substantial amount of water vapor being removed with said residual gas with resultant concentration of said solution, and thereafter cooling said solution and crystallizing ammonium sulfate from said solution.

References Cited in the file of this patent

UNITED STATES PATENTS

| | | |
|---|---|---|
| 1,052,797 | Collett | Feb. 11, 1913 |
| 1,063,007 | Bosch | May 27, 1913 |
| 1,076,747 | Collett | Oct. 28, 1913 |
| 1,508,736 | West | Sept. 16, 1924 |
| 1,823,372 | Merriam | Sept. 15, 1931 |
| 1,888,633 | Hori | Nov. 22, 1932 |
| 1,931,408 | Hodsman | Oct. 17, 1933 |
| 1,986,889 | Fulton | Jan. 8, 1935 |
| 2,011,307 | Peski | Aug. 13, 1935 |
| 2,021,093 | Kreisler | Nov. 12, 1935 |
| 2,026,250 | Pyzel | Dec. 31, 1935 |
| 2,067,899 | Bragg | Jan. 19, 1937 |
| 2,095,074 | Muus | Oct. 5, 1937 |
| 2,233,841 | Lepsoe | Mar. 4, 1941 |
| 2,405,747 | Hixson | Aug. 13, 1946 |
| 2,676,090 | Johnstone | Apr. 20, 1954 |

UNITED STATES PATENT OFFICE
Certificate of Correction

Patent No. 2,810,627 October 22, 1957

Henry F. Johnstone et al.

It is hereby certified that error appears in the printed specification of the above numbered patent requiring correction and that the said Letters Patent should read as corrected below.

Column 1, line 28, after "sulfur" insert —as sulfur—; column 11, line 22, strike out "out-of-contact".

Signed and sealed this 28th day of April 1959.

[SEAL]

Attest:
T. B. MORROW,
*Attesting Officer.*

ROBERT C. WATSON,
*Commissioner of Patents.*